United States Patent
Perry et al.

(10) Patent No.: US 8,470,480 B2
(45) Date of Patent: Jun. 25, 2013

(54) CIRCULATION OF GAS-ENTRAINED FUEL CELL COOLANT

(76) Inventors: Michael L. Perry, South Glastonbury, CT (US); Robert M. Darling, South Windsor, CT (US)

(*) Notice: Subject to any disclaimer, the term of this patent is extended or adjusted under 35 U.S.C. 154(b) by 1364 days.

(21) Appl. No.: 12/087,088

(22) PCT Filed: Dec. 29, 2005

(86) PCT No.: PCT/US2005/047494
§ 371 (c)(1), (2), (4) Date: Jun. 25, 2008

(87) PCT Pub. No.: WO2007/075173
PCT Pub. Date: Jul. 5, 2007

(65) Prior Publication Data
US 2009/0011288 A1    Jan. 8, 2009

(51) Int. Cl.
*H01M 8/06* (2006.01)

(52) U.S. Cl.
USPC .......................................................... 429/414

(58) Field of Classification Search
USPC ................................................. 429/414, 429
See application file for complete search history.

(56) References Cited

U.S. PATENT DOCUMENTS

| | | | |
|---|---|---|---|
| 3,801,372 A | 4/1974 | Shaw | |
| 4,678,723 A | 7/1987 | Wertheim | |
| 6,689,500 B2 | 2/2004 | Nelson | |
| 8,048,581 B2 * | 11/2011 | Darling et al. | 429/437 |
| 2002/0061426 A1 * | 5/2002 | Imaseki et al. | 429/26 |
| 2002/0119356 A1 * | 8/2002 | Shimanuki et al. | 429/26 |
| 2003/0039872 A1 * | 2/2003 | Grasso et al. | 429/24 |
| 2003/0118883 A1 * | 6/2003 | Breault et al. | 429/26 |
| 2004/0142217 A1 * | 7/2004 | Couch et al. | 429/13 |
| 2004/0170878 A1 | 9/2004 | Goebel | |
| 2005/0095475 A1 * | 5/2005 | Breault et al. | 429/26 |
| 2006/0110641 A1 * | 5/2006 | Wilson et al. | 429/26 |
| 2007/0116621 A1 * | 5/2007 | De Vaal et al. | 423/248 |
| 2008/0280993 A1 * | 11/2008 | Jerussi et al. | 514/657 |

* cited by examiner

*Primary Examiner* — Patrick Ryan
*Assistant Examiner* — Lucas J O Donnell
(74) *Attorney, Agent, or Firm* — M. P. Williams

(57) ABSTRACT

Coolant velocity greater than zero everywhere within the coolant channels (78, 85) of fuel cells (38) in a fuel cell stack (37) is assured by providing a flow of gas in the coolant channels, the flow being created by gas pressure from a source (92) of pressurized gas, an oxidant reactant air pump (52), a source (75) of hydrogen-containing fuel, or the fuel outlet (47), or the outflow of a condenser (59). Positive pressure may be applied to the coolant inlet (66) or negative pressure from an eductor (97) may be applied to a gas outlet (90) of the coolant channels, or both. Using gas to induce flow within the coolant channels eliminates the need for a bubble-clearing liquid pump and reduces liquid inventory and other plumbing; this makes the fuel cell power plant more freeze tolerant. Biphase flow from the condenser, which may be a vehicle radiator (120), renders the coolant return flow more freeze tolerant. Separate cooler plates (122) may be used with a coolant management system (125).

13 Claims, 7 Drawing Sheets

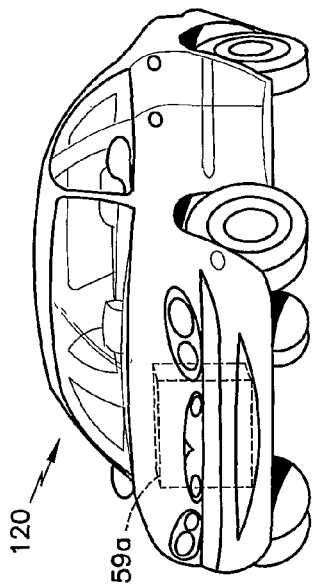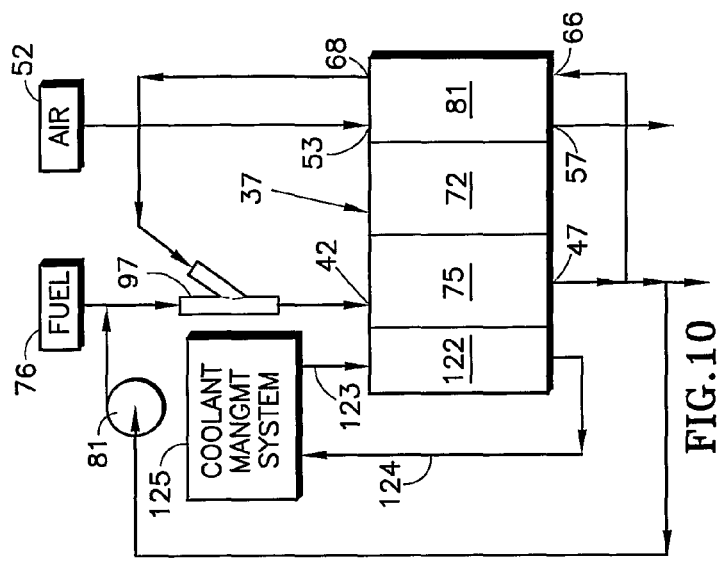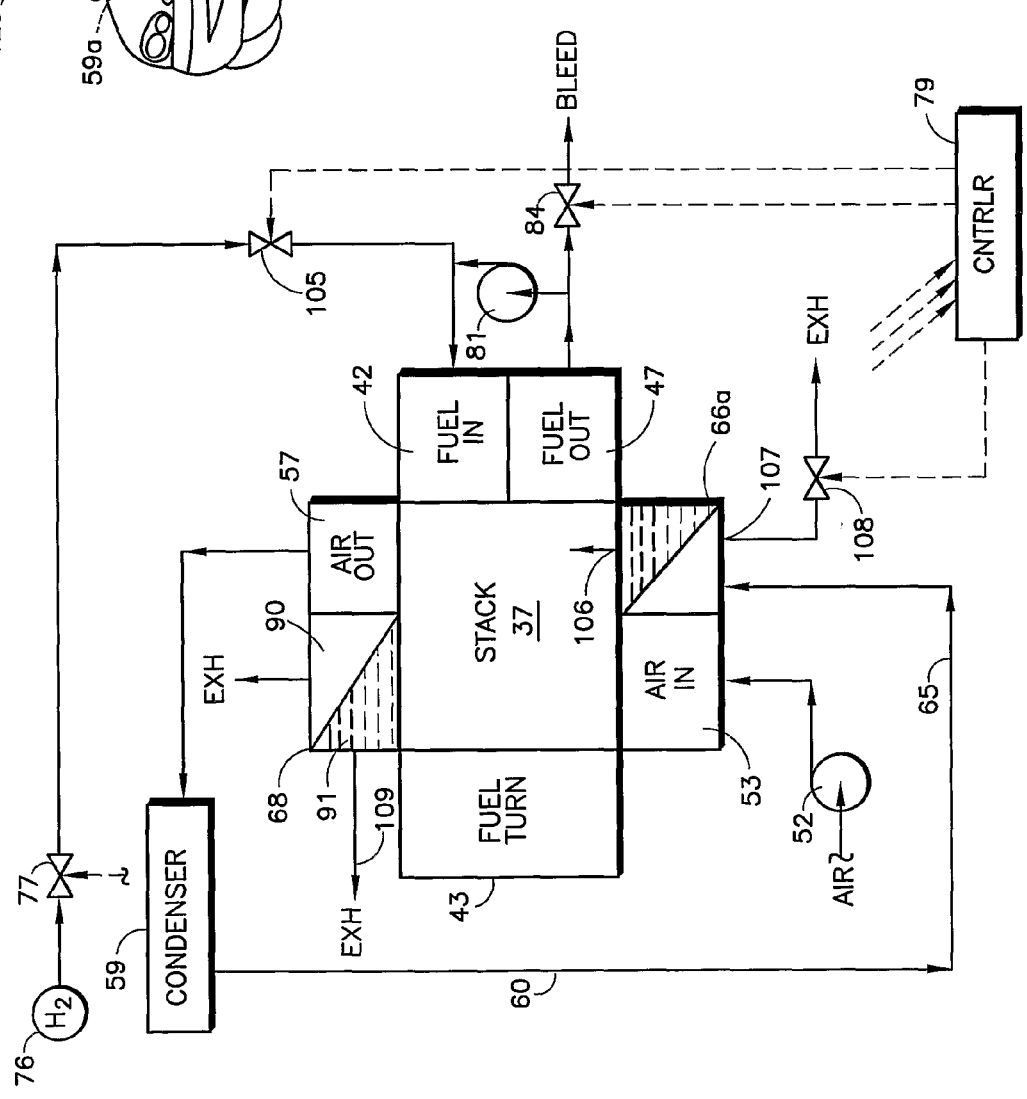

CIRCULATION OF GAS-ENTRAINED FUEL CELL COOLANT

TECHNICAL FIELD

This invention relates to reducing gas bubble blockage in small, low flow coolant or water management passageways in fuel cells, by flowing sufficient gas, such as air or depleted reactant exhaust, to ensure a liquid velocity greater than zero everywhere in the coolant channels.

BACKGROUND ART

In order to reduce the exposure of proton exchange membrane (PEM) fuel cells to problems resulting from freezing temperatures, and to reduce reliance on water pumps and other plumbing as accessories to the fuel cells, the total volume of coolant in the fuel cells may be reduced.

However, in systems which do not use either a coolant pump or a gas venting micropump, and have minimal external water plumbing, the flow rate of coolant or water in the cells is quite low. If only gas is vented from the coolant or water passageways, the flow is limited by the amount of water which evaporates into the reactant gases. With small passageways and low water flow, gas bubbles may join together (aggregate) and block water flow from large areas of the coolant channels which may cause porous, hydrophilic reactant gas flow field plates (water transport plates) to dehydrate. The dehydration allows gas to enter the coolant flow channels at too high a rate, sometimes referred to as "gas breakthrough" of the water transport plates, thereby causing localized heating and dehydration of the membrane at various spots, resulting in degradation of components and reduced performance.

Systems employing between-cell coolant plates, which have glycol or other coolants, are sometimes referred to as active water management (AWM) fuel cells, as disclosed in patent publication US 2005/0142408. AWM fuel cells may also have extremely small, in-cell water passageways to provide low flows of water to the anode side and/or cathode side of the fuel cells for water management, with insignificant cooling resulting from the water flow.

DISCLOSURE OF INVENTION

Aspects of the invention include: assuring coolant flow in small fuel cell coolant or water management passageways; mitigating bubble blockage in low-flow fuel cell coolant or water management passageways; assisting gas bubbles to flow through coolant or water management passageways in PEM fuel cells; improved venting of gas in PEM fuel cell coolant or water management passageways; reducing excessive ingestion of gas into fuel cell coolant or water management passageways; increasing gas flow toward a vent in PEM fuel cells; improved hydration in PEM fuel cells; improved evaporative cooling in PEM fuel cells; and reducing the number of components in the fuel cell power plant which have rotating parts.

As used herein, the term "fuel cell" may mean the apparatus for a complete, operative fuel cell capable of producing electricity from oxidant and fuel reactant gases, or where the context so requires, that term may mean the portion of a fuel cell exclusive of layers that provide coolant and/or water management to the fuel cells, which may be disposed between adjacent ones of said fuel cell portions.

As used herein, the term "coolant passageways" includes water management passageways and refers to those portions of the coolant and/or water management flow paths in fuel cell stacks which are substantially coextensive with the planform (the in-plane outline) of the fuel cells.

According to the present invention, gas applied to fuel cell coolant or water management passageways assures a non-zero velocity of flow through the passageways.

According to the invention, gas flow through (or pressure drop across) coolant/water passageways of fuel cells promotes flow of fluid, including coolant/water and gas bubbles within such passageways.

The invention may be practiced by applying a positive gas pressure to the inlet to the passageways, or it may be practiced by applying a negative gas pressure to the exit of the passageways, or both.

In accordance with the invention, a source of pressurized gas may be applied to the coolant or water management inlet of the fuel cell stack. The source of pressurized gas may be anything suited to any individual implementation of the invention, such as a pump related to other equipment associated with the fuel cell; in accordance further with the invention, the source of pressurized gas may comprise a fraction of the air provided by a cathode air pump; or the source of pressurized gas may comprise the fuel or air exhaust, or a fraction of such exhaust, of the fuel cell.

In still further accord with the invention, the pressure may be applied to the outlet of the coolant/water passageways, by creating a vacuum; in one embodiment, the vacuum is created by an eductor (ejector) in which the primary inlet is connected to the fuel gas being fed to the fuel cell stack anodes, the secondary inlet of the eductor is connected to the gas outlet of a gas/liquid separator at the coolant/water outlet of the fuel cell stack, and the outlet of the eductor is connected to the fuel flow fields of the stack. In another embodiment, the eductor that creates pressure has its primary inlet connected to the cathode air pump, with its secondary inlet connected to the gas exhaust of a gas/liquid separator at the coolant/water outlet of the fuel cell stack, and the eductor outlet is connected to the cathode air flow fields.

The invention may be practiced utilizing other means at the inlet or at the outlet of the coolant/water flow passageways to create a sufficient gas pressure differential to assure a velocity of a liquid/gas mixture greater than zero (or nil) everywhere in the passageways, thereby preventing the aggregation of gas within the passageways which could impede or block the flow of liquid.

The water recovered from a gas/liquid separator may be recirculated into the stack, such as by being fed from the output of a condenser in a fuel cell utilizing evaporative cooling. The water may be returned in other embodiments by connection with the coolant/water inlet of the fuel cell stack.

In an embodiment of the invention in which fuel exhaust is injected into the coolant/water passageways, all of the fuel exhaust can be injected into the passageways, with no bypass of fuel exhaust, because the total gas flow rate is appropriate for the coolant/water passageways. Alternatively, only some of the fuel exhaust may be used. Additionally, the fuel exhaust exit control valve provides gas at an appropriate pressure for introduction into the passageways. A benefit of this form of the invention is that some of the exhausted fuel may diffuse from the coolant or water passageways, through the porous reactant gas flow field plates and be consumed within the cathodes of the fuel cell stack, which will beneficially reduce the hydrogen emissions from the fuel cell power plant.

If the invention is implemented utilizing an eductor driven by the fuel source to apply a negative pressure to the outlet of the coolant/water passageways, the small amount of air sucked through the coolant/water channels in a secondary inlet of the eductor will enter the fuel stream and will serve as a source of air bleed in the fuel, to increase the tolerance of the fuel cell stack to carbon monoxide and/or other contaminants in the fuel.

In an advantageous embodiment of the invention, the anode exhaust is connected to the coolant/water passageway inlet. The passageway outlets are connected to a secondary inlet of an eductor. The control (primary) inlet of the eductor is connected to the source of fuel, and the outlet is connected to the fuel inlets of the fuel cell stack. In addition to other advantages recited hereinbefore, most of the fuel exhaust is recycled through the eductor back to the fuel inlet, in this configuration.

According further to the invention, the cathode air exhaust is applied through a condenser to an inlet of the coolant/water passageways which comprises a gas/liquid separator, thereby providing a freeze-tolerant biphase mixture of liquid and gas to the coolant inlets. The exhaust of gas from a gas outlet of the separator is controllable so as to provide a range of gas flowing through the passageways which extends from miniscule to a significant, bubble-clearing flow rate. This form of the invention eliminates an accumulator or reservoir for the condensate, allowing two-phase fluid flow from the condenser to the coolant/water passageway inlet, thereby rendering the return flow from the condenser to the fuel cell stack significantly more resistant to freezing. In this form, the condenser may comprise the radiator of a vehicle being powered by the stack of fuel cells employing the invention.

The invention eliminates pumps and reduces liquid inventory by an order of magnitude or more, thus rendering fuel cells more robust and more freeze tolerant.

Other aspects, features and advantages of the present invention will become more apparent in the light of the following detailed description of exemplary embodiments thereof, as illustrated in the accompanying drawing.

BRIEF DESCRIPTION OF THE DRAWINGS

FIG. 8 is a simplified, stylized block diagram of an evaporatively cooled fuel cell system which applies freeze-tolerant biphase condensate from a cathode exhaust condenser directly to the inlet of the coolant channels.

FIG. 9 is a simplified sketch of a vehicle powered by a fuel cell employing the invention, utilizing its radiator as a condenser for cathode exhaust.

FIG. 10 is a simplified, stylized block diagram of a modification of the embodiment of FIG. 6 having active coolant management employing direct coolant antifreeze in cooler plates between fuel cells.

MODE(S) FOR CARRYING OUT THE INVENTION

Figure 1:
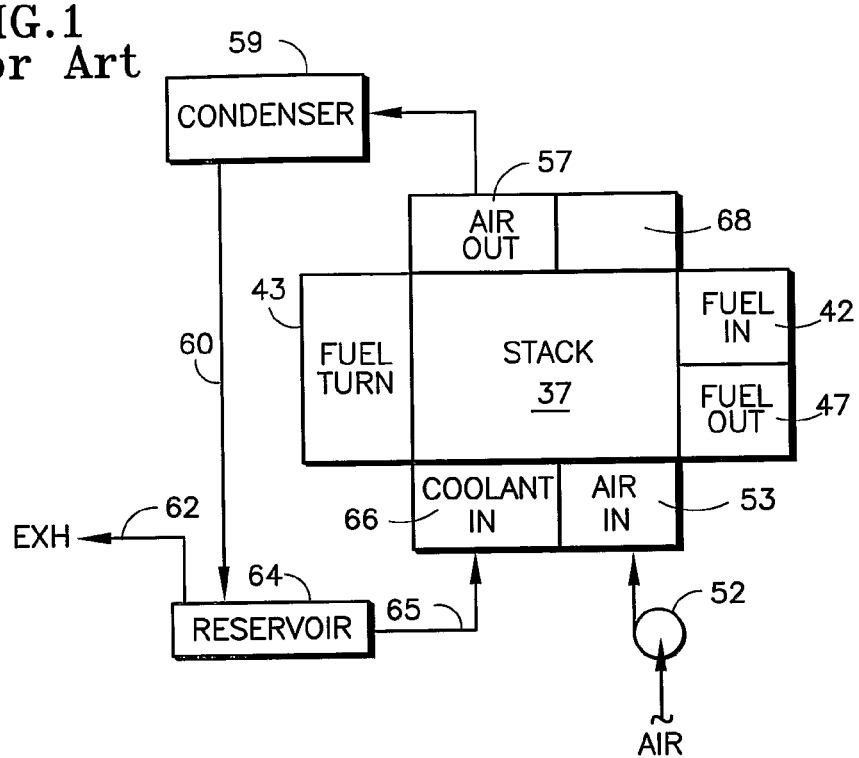
FIG. 1 is a simplified, stylized block diagram of an evaporatively cooled fuel cell system which may be modified to employ the present invention.

A fuel cell system employing evaporative cooling is disclosed in U.S. Ser. No. 11/230,066 filed Sep. 19, 2005, and described with respect to FIGS. 1 and 2 herein. In the aforementioned application, a fuel cell stack 37 receives fuel from an inlet 42; the fuel passes to the left in a first half of the fuel flow field and then is returned by a fuel turn manifold 43 to pass to the right through the other half of the stack and through a fuel outlet 47. Air is pumped through an air inlet 53 by an air pump 52 into the oxidant reactant gas (air) flow fields in the stack 37; water evaporates into the air, thereby cooling the fuel cells 38 (FIG. 2). The outflow 57 of the oxidant reactant gas channels passes through a condenser 59 wherein heat is removed and the water is recovered and returned over a conduit 60 to a water/gas separator which also serves as a reservoir 64. Any gas in the water is removed through exhaust 62. The water returns over a conduit 65, through coolant inlets 66 into the coolant passageways in the stack 37. Coolant, such as water, flows from the water inlet 66 through coolant passageways 78, 85 (FIG. 2) in the stack 37 and upward toward an outlet 68.

In FIG. 2, fuel cells 38 each comprise a conventional membrane electrode assembly 72, which includes an electrolyte with anode and cathode catalysts on opposite sides thereof and may include a gas diffusion layer on one or both electrodes. Fuel reactant gas flows through channels 74 in a fuel reactant gas flow field plate 75 having grooves 76, which together with grooves 77 of an adjacent fuel cell, form minute water passageways 78 at a juncture 79a of the fuel cells 38. On the cathode side, an oxidant reactant gas flow field plate 81 includes air flow channels 82 and grooves 83 which, with grooves 84 on an adjacent fuel cell, together form minute water passageways 85 at a juncture 86 of the fuel cells.

To prevent flooding, pressure of water in the passageways is between one and ten Kilopascals lower than the pressure of the reactant gases, such as provided by an air pump and pressure-regulated fuel.

The passageways may be formed other than by matching grooves as shown, such as by channels 76, 83 or 77, 84 provided in only one of the reactant gas flow field plates 75, 81.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700,595. However, because there is about a forty-times improvement in cooling effectiveness per volume of water when evaporative cooling is used, the water flow channels of the aforesaid '595 patent have cross sections which are several tens of times larger than the cross sections of the water passageways 78, 85 in FIG. 2.

In another embodiment of the aforementioned patent application, there is a layer of material which is conductive, hydrophilic and has a high permeability to water, extending over substantially the entire planform of the reactant gas flow field plates 75, 81 in place of grooves forming passageways 78, 85. Such material may be carbon fiber paper, with fibers aligned in the direction of water motion to help with in-plane water permeability, or it may be other material conventionally used as fuel cell diffusion media.

The water passageways are typically very small and capable of providing the water required for evaporative cooling. Also, water flow in addition to that needed for evaporative cooling can assist in removing gas bubbles which leak in from the reactant gas channels. This water flow may assist in deionizing (demineralizing) water which is circulating in the system. Such water flow can be adequate only if provided by a pump and plumbing external to the fuel cells, with a significant inventory of water, which is a disadvantage in freezing climates.

Figure 2:
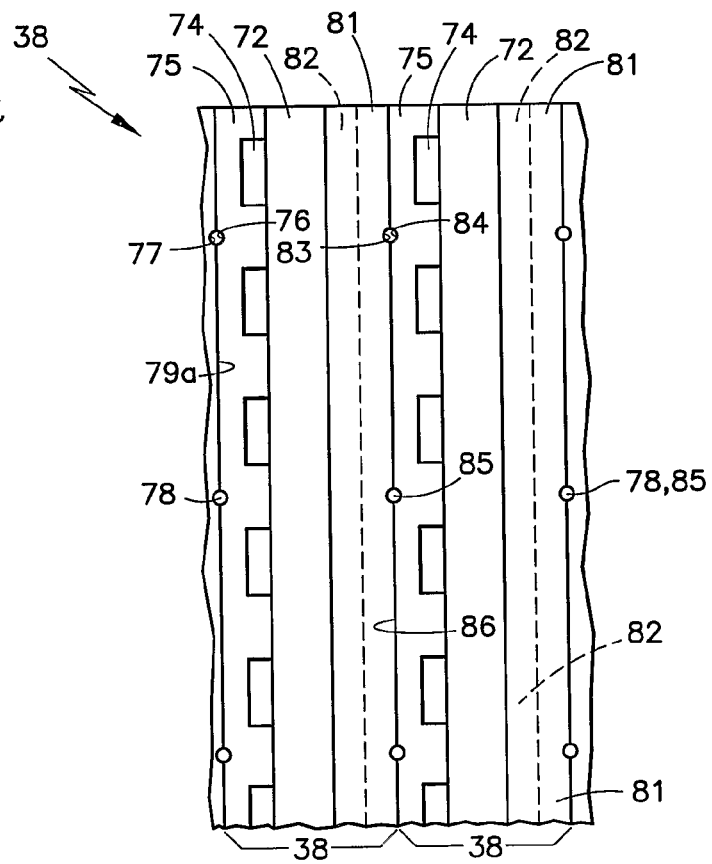
FIG. 2 is a partial, sectioned side elevation view of a pair of fuel cells employing minute water passageways, with the sectioning lines omitted for clarity.
Figure 3:
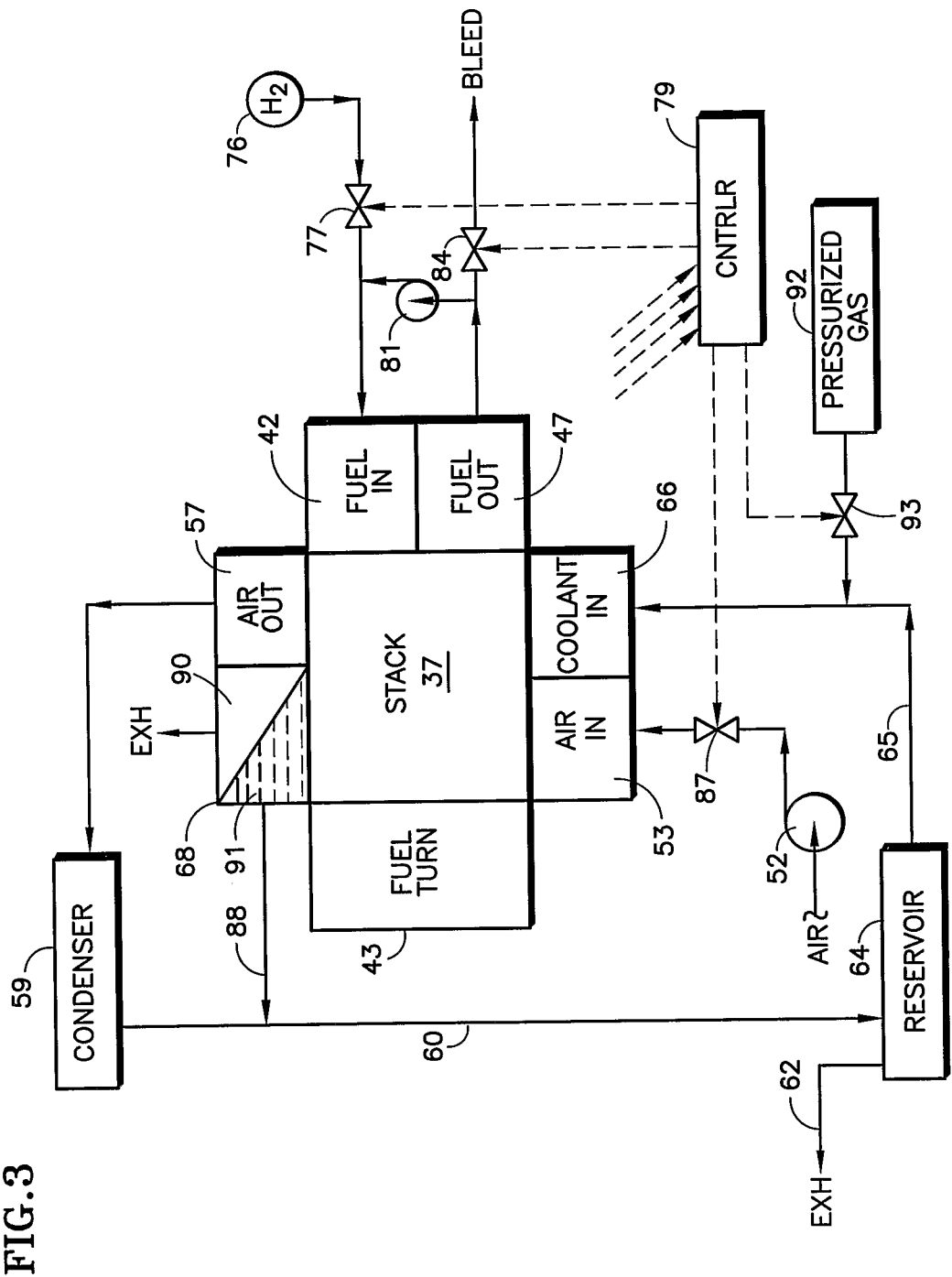
FIGS. 3-7 are simplified, stylized block diagrams of an evaporatively cooled fuel cell system with gas pressure across the coolant passageways according to respective embodiments of the present invention.

Referring to FIG. 3, a generalized embodiment of the invention is shown in a fuel cell power plant substantially as described with respect to FIG. 1 hereinbefore, but with additional details and elements. In FIG. 3, there is a source 76 of hydrogen-containing gas which passes through a valve 77 to the fuel inlet 42. The valve 77 is adjusted by a controller 79. The fuel outlet 47 is fed to a fuel recycle pump 81 which returns fuel exhaust to the fuel inlet 42, as is conventional. The fuel outlet is also connected to a bleed valve 84 adjusted by the controller 79 to release some of the exhausted fuel either periodically or at a slow bleed rate, thereby to eliminate some of the impurities, particularly nitrogen, which build up in the recycled fuel. The exhausted fuel passing through the bleed valve 84 may be reacted in a catalytic converter or fed into the oxidant reactant stream as disclosed in U.S. Pat. No. 6,124, 054.

The controller may also control a valve 87 between the air pump 52 and the air inlet 53.

The coolant outlet, which in this embodiment is the water outlet 68, is a gas/liquid separator, such as a hydrophobic porous plug, in which gas is allowed to escape from a gas vent 90 and coolant (such as water) is allowed to pass through a liquid outlet 91 and a conduit 88 to return through the conduit 60 and reservoir 64 to the water inlet 66. Gas is provided, by any selected source of pressurized gas 92 (described hereinbefore), to the coolant inlets 66 through a valve 93 which is regulated by the controller 79. The amount of gas required is quite small and the pressure is low; the pressurized gas is just enough to ensure that there is a flowing mixture of gas and coolant (in this embodiment water) through the coolant channels to ensure a coolant velocity greater than zero everywhere in the coolant channels. Such a flow ensures that gas cannot accumulate into bubbles that can block the flow of coolant, and/or the flow of humidification fluid, in this embodiment both being the flow of water through the coolant channels.

Figure 4:
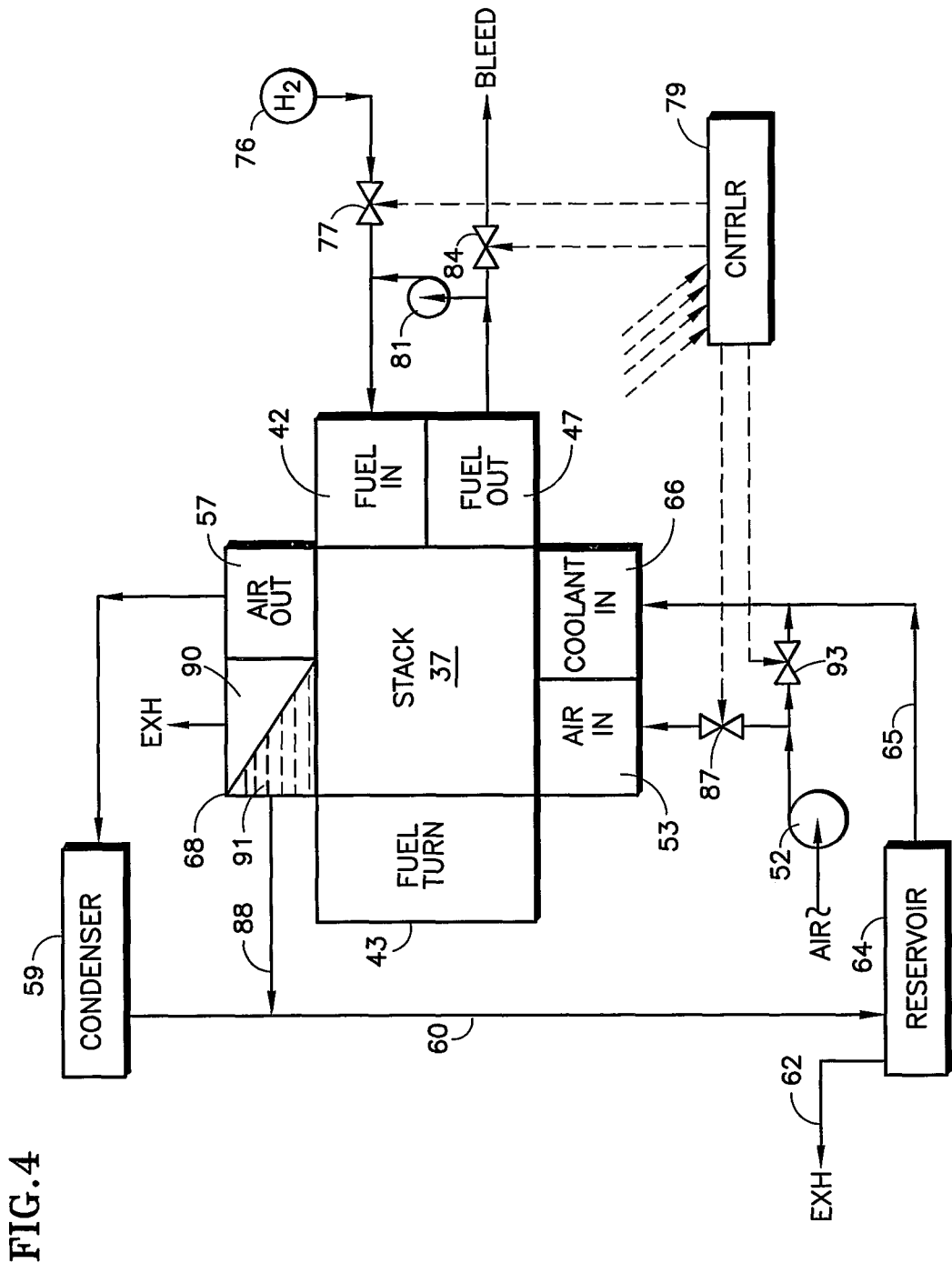

Referring to FIG. 4, a simple embodiment of the invention utilizes a portion of the air from the oxidant pump 52, having the flow reduced significantly by the valve 93 before application to the water inlet 66.

Figure 5:
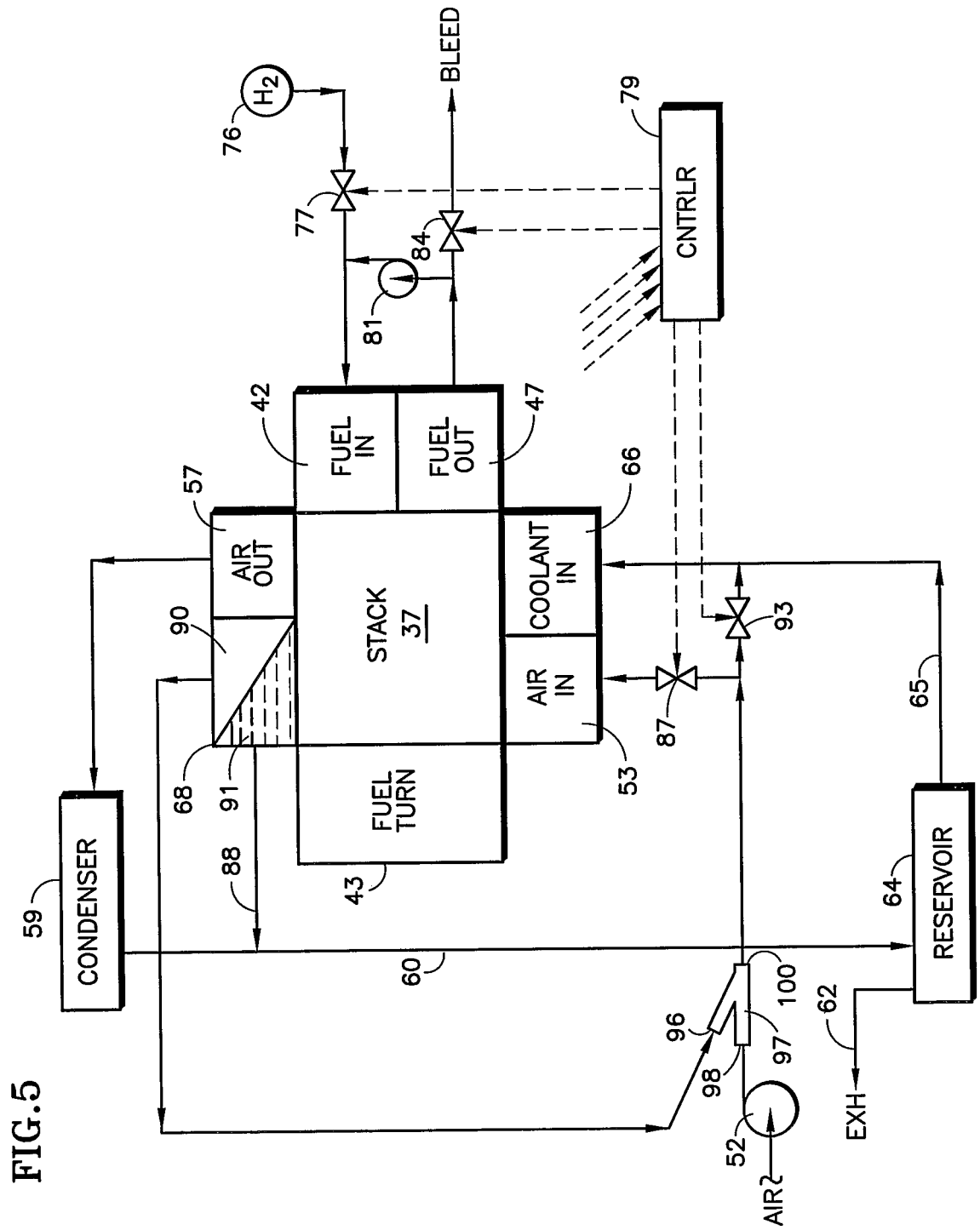

FIG. 5 illustrates an embodiment of the invention which provides both positive and negative pressure to the water passageways. In FIG. 5, the gas vent 90 of the coolant outlet 68 is connected to the secondary inlet 96 of an eductor 97, the control inlet 98 of which is connected to the cathode air pump 52; the outlet 100 of the eductor is applied through the valve 87 to the air inlets 53 and through the valve 93 to the coolant inlets 66. In this embodiment, the gas from the coolant flow fields is eventually vented from the reservoir 64, after passing through the eductor, the air flow fields and the condenser.

Figure 6:
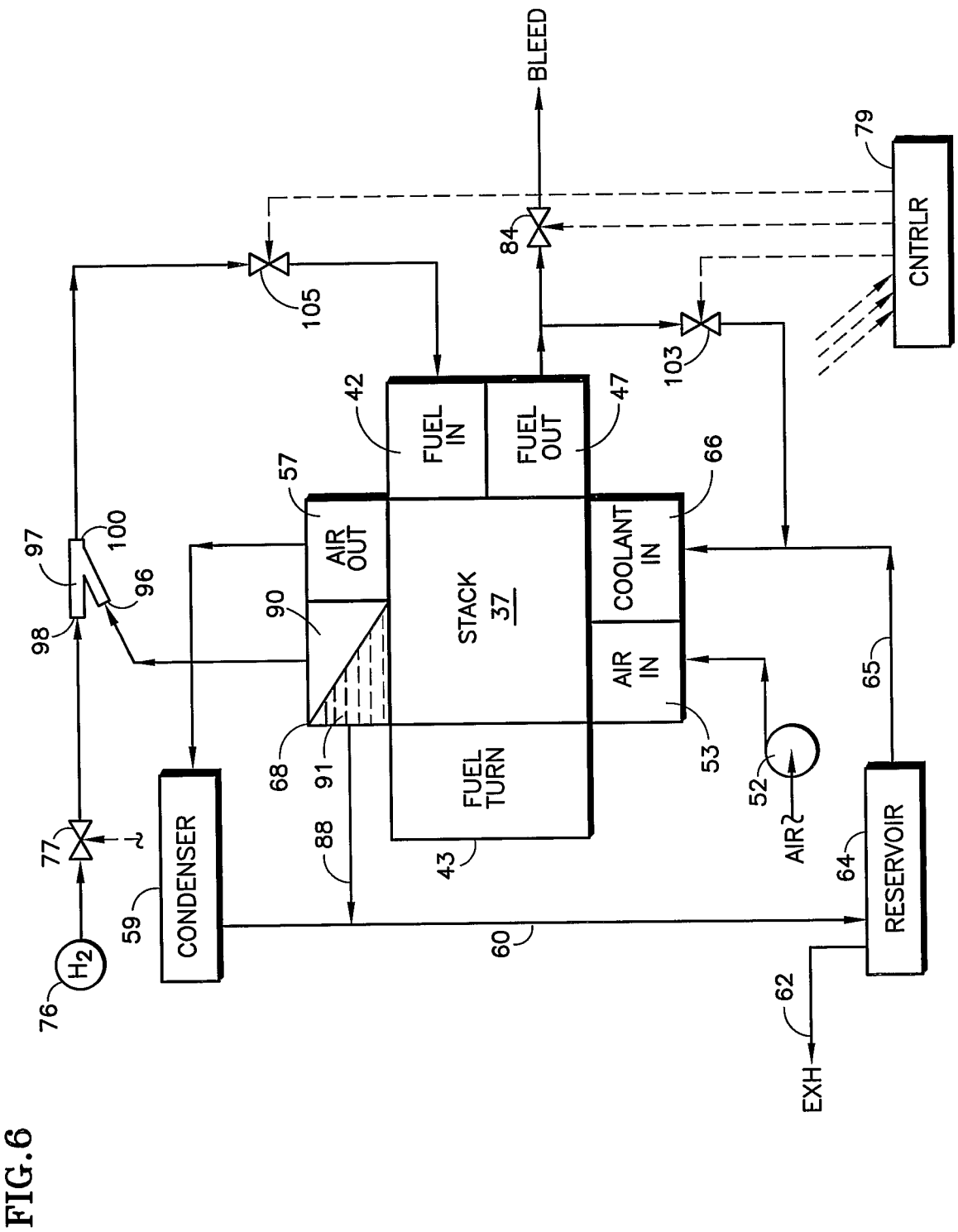

In an embodiment of the invention shown in FIG. 6, the fuel outlets 47 are connected through a valve 103 to the coolant inlets 66. A fuel cell having fuel utilization around or above 90% provides an amount of fuel exhaust which is appropriate to flow through the coolant channels, eliminating any need for splitting the fuel exhaust flow or other conditioning before application to the coolant inlet 66. The exit pressure of the fuel exhaust is easily made appropriate for application to the coolant channels through adjustment of the control valve 103 by the controller 79. An advantage of this embodiment is that some of the exhausted fuel will diffuse out of the coolant channels, through the porous oxidant reactant gas flow field plates and be consumed at the cathodes of the stack. Consumption of additional exhaust fuel reduces hydrogen emissions from the system, which is an additional benefit.

In FIG. 6, the eductor 97 is in the fuel inlet line. In this case, the control inlet 98 is connected through the valve 77 to the source of hydrogen-containing gas 76. The secondary inlet is connected to the gas vent 90 of the coolant outlet 68. The outlet 100 of the eductor 97 is connected through a valve 105 to the fuel inlet 42. The valves 77 and 105 can be adjusted by the controller so as to provide the desired pressure relationship through the eductor 97. One advantage of this embodiment is that the small amount of air ingested into the coolant from the cathode air, sucked through he eductor 97 into the fuel stream, may also serve as the source of air bleed in the fuel, to increase the tolerance of the fuel cell stack to contaminants in the fuel, especially carbon monoxide which is mostly converted to carbon dioxide.

To ensure that the air bleed is not excessive, the eductor may be designed to limit its maximum low-pressure gas intake, and/or a hydrogen sensor cell may be used to detect, in situ, whether there is excessive air being applied to the fuel inlet 42. An additional advantage of this combination is that most of the fuel exhaust will be recycled to the fuel inlet. As in other embodiments, the fuel bleed valve 84 may vent fuel to a catalytic burner or to the cathode inlet of the stack.

Advantageous embodiments of the invention are the combinations illustrated in FIGS. 5 and 6; that is, connecting the air inlet or the fuel exhaust to the coolant inlet and providing an eductor driven by inlet air or fuel and having its secondary inlet connected to the coolant gas vent.

Figure 7:
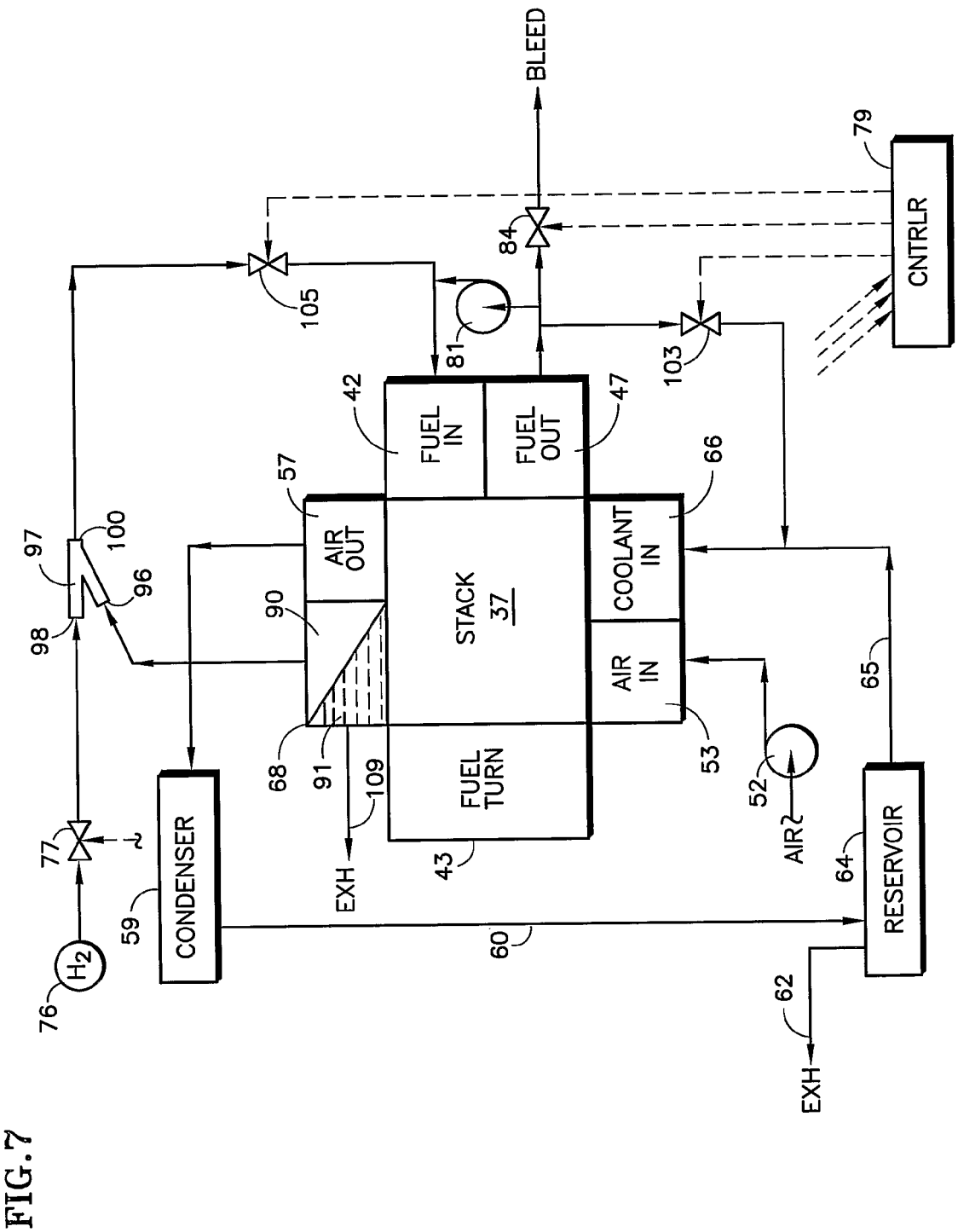

Another embodiment of the invention, illustrated in FIG. 7, is similar to that of FIG. 6. However, FIG. 7 illustrates that fuel recycle may be provided, such as by a fuel recycle pump 107. There may be a regulating valve in the fuel recycle loop along with the pump 107, if deemed necessary in any instance.

FIG. 7 also illustrates that the liquid outlet 91 of the gas/liquid separator 68 need not be connected to the conduit 60 for return of the water to the reservoir 64. Instead, a conduit 109 may lead the water to exhaust. This feature (exhausting the water from the outlet 91) may also be employed in any of the embodiments illustrated in FIGS. 3-6.

In the embodiment of FIG. 8, the reservoir 64 does not have a gas vent, so the condensate from the condenser 59 and the remaining cathode exhaust air are both fed in a biphase mix through the conduits 60, 65 to a gas/liquid separator 66a which comprises the coolant inlet in this embodiment. The water outlet 106 is applied to the coolant channels, and a gas outlet 107 is connected through a controlled valve 108 to exhaust. By controlling the back pressure of the gas outlet, a certain amount of gas will pass through the coolant channels with the liquid from nil to a bubble sweeping flow.

The embodiment of FIG. 8 can be extremely useful in a power plant employing the fuel cell stack 37 of this embodiment in a fuel cell powered electric vehicle 120 (FIG. 9). In such a case, the condenser 59 is a conventional vehicle radiator 59a, the reservoir 64 typically being combined with the radiator at the base thereof. In addition to providing bubble-removing flow through the coolant channels, if desired, this embodiment has the additional advantage of carrying the condensate and the cathode exhaust air as a biphase fluid through the conduits 60, 65. This will depress the freeze temperature of the water portion of the biphase fluid. By omitting a reservoir, this also minimizes the volume of liquid water external to the stack where the risk of freezing is greater because of not being in thermal communication with the waste heat of the stack. The use of this embodiment minimizes the risk of freezing in the return conduits 60, 65.

The water gas separator 66a may be combined with the coolant inlet manifold, or may be adjacent to the coolant inlet manifold. In various embodiments, the valve 108 may be controlled so that there is no gas, or some gas, or all the gas that is present exiting the separator 66a through the water outlet 106.

In the AWM fuel cell system of FIG. 10, the communication of gas to the coolant inlet 66 and from the coolant outlet 68 is the same as described hereinbefore with respect to FIG. 6. In FIG. 10, the liquid passageways between the coolant inlet 66 and the coolant outlet 68 are water management passageways, as described in the aforementioned publication, incorporated herein by reference. Cooling is provided by cooler plates 122 which circulate coolant, typically having a freeze resisting component such as glycol. The coolant is conducted over conduits 123, 124 between the cooler plates and a coolant management system 124, which has temperature and composition (e.g., anti-dilution) control functions, as described in said publication.

Cooler plates may be disposed between each adjacent pair of fuel cells, but are typically disposed one for every two-four fuel cells.

In the embodiment of FIG. 10, it is water which is caused to have a non-zero velocity in the in-cell passageways. Fuel cell systems with between-cell cooling may use other techniques described herein to achieve non-zero flow of water in water management passageways between the inlet 66 and the outlet 68.

This invention may be used in an evaporatively cooled fuel cell employing an antifreeze mixture, as disclosed in patent application PCT/US 05/43942, filed Dec. 1, 2005.

The invention claimed is:

1. A method in a fuel cell power plant having a stack (37) of fuel cells (38), each fuel cell having coolant passageways (78, 85) connected between a coolant inlet (66) and a coolant outlet (68), said method characterized by:
   during normal operation of said fuel cell power plant, while said fuel cell power plant is generating electric power, communicating (92, 52, 96, 47, 60, 65) one or more gases with said coolant outlet and providing one or more gases to said coolant inlet,
   which assures a velocity of coolant greater than zero from said inlet through said coolant passageways to said outlet.

2. A fuel cell power plant comprising: a stack (37) of fuel cells (38), each fuel cell having coolant passageways (78,85) connected between a coolant inlet (66) and a coolant outlet (68); characterized by:
   fluid communication (92, 52,96,47; 60, 65) operable during normal operation of said fuel cell power plant, while said fuel cell power plant is generating electric power, between said coolant outlet and one or more gases, and between said coolant inlet and one or more gases provided to said coolant inlet during normal operation of said fuel cell power plant,
   which assures a velocity of coolant greater than zero from said inlet through said coolant passageways to said outlet.

3. A fuel cell power plant according to claim 2 further characterized by:
   said coolant outlet (68) includes a gas/liquid separator (90/91) having a gas outlet (90); and
   said fluid communication is between said gas outlet and a gas (96) having a pressure less than coolant pressure at said coolant inlet (66).

4. A fuel cell power plant according to claim 3 further characterized by:
   said fluid communication (92, 52, 47; 60, 65) is also between said coolant inlet (66) and a gas having a pressure greater than coolant pressure at said coolant outlet (68).

5. A fuel cell power plant according to claim 2 further characterized by:
   said coolant outlet (68) includes a gas/liquid separator (90/91) having a gas outlet (90); and
   said fluid communication includes (a) communication between said coolant inlet (66) and a gas (52,47) having a pressure greater than coolant pressure at said coolant outlet and (b) communication between said gas outlet (90) and a gas (96) having a pressure less than coolant pressure at said coolant inlet (66).

6. A fuel cell power plant according to claim 3 further characterized by:
   said fluid communication is also between a source of pressurized gas (92, 47, 52; 60, 65) and said coolant inlet (66).

7. A fuel cell power plant comprising: a stack (37) of fuel cells (38), each fuel cell having coolant passageways (78,85) connected between a coolant inlet (66) and a coolant outlet (68), a fuel reactant gas flow field plate (75) connected between a fuel inlet (42) and a fuel outlet (47), an oxidant reactant gas flow field plate (81) connected between an air inlet (53) and an air outlet (57), a membrane electrode assembly, including anode and cathode catalysts, disposed between said flow field plates, at least one of said plates being porous and hydrophilic; characterized by:
   fluid communication operable during normal operation of said fuel cell power 10 plant, while said fuel cell power plant is generating electric power, between said coolant outlet and one or more gases (92, 52, 96, 47; 60, 65), and between said coolant inlet and one or more gases provided to said coolant inlet,
   which provides a sufficient pressure differential across said coolant passageways to assure a velocity of coolant/gas mixture from said inlet to said outlet greater than zero everywhere in said coolant passageways.

8. A fuel cell power plant according to claim 7 further characterized by:
   said fluid communication includes communication between said coolant inlet (66) and a pump (52) that supplies air to said oxidant reactant gas flow fields (82) through said air inlet (53).

9. a fuel cell power plant according to claim 7 further charchterized by:
   said fluid communication is between said fuel outlet (47) and said coolant inlet (66).

10. A fuel cell power plant according to claim 7 further characterized by:
    said coolant outlet (68) includes a gas/liquid separator (90/91) having a gas outlet (90); and
    said fluid communication includes (a) communication between said coolant inlet (66) and an air pump (52) that supplies oxidant reactant gas to said fuel cells, and (b) communication between said gas outlet (90) and a secondary inlet (96) of an eductor (97) having a primary inlet (98) connected to said air pump and an eductor outlet (100) connected to the oxidant reactant gas flow fields (81) through said air inlet (53)

11. A fuel cell power plant according to claim 7 further characterized by:
    a source (75) of hydrogen-containing gas;
    said coolant outlet (68) includes a gas/liquid separator (90/91) having a gas outlet (90); and said fluid communication includes (a) communication between said fuel outlet (47) and said coolant inlet (66) and (b) communication between said gas outlet (90) and a secondary inlet (96) of an eductor (97) having a primary inlet (98) connected to said source of hydrogen-containing gas and having an eductor outlet (100) connected to said fuel inlet (42).

12. A fuel cell power plant according to claim 7 further characterized by:
    a condenser (59); and
    biphase flow of condensate and gas from said condenser in fluid communication (60, 65) with said coolant inlet (66a).

13. A fuel cell power plant according to claim 7 further characterized by:
    a condenser (59);
    said coolant inlet (66) includes a gas/liquid separator (66a) having a liquid outlet (106) and a gas outlet (107); and
    said fluid communication is from said air outlet (57), through said condenser, to said coolant inlet (66).

* * * * *